(12) United States Patent
Saito et al.

(10) Patent No.: US 11,897,272 B2
(45) Date of Patent: Feb. 13, 2024

(54) LIQUID EJECTION DEVICE, PROGRAM AND EJECTION CONTROL METHOD

(71) Applicants: Yosuke Saito, Tokyo (JP); Atsushi Hada, Kanagawa (JP); Yuki Tsuchiya, Kanagawa (JP); Daisuke Mezaki, Kanagawa (JP)

(72) Inventors: Yosuke Saito, Tokyo (JP); Atsushi Hada, Kanagawa (JP); Yuki Tsuchiya, Kanagawa (JP); Daisuke Mezaki, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 325 days.

(21) Appl. No.: 17/294,831

(22) PCT Filed: Nov. 28, 2019

(86) PCT No.: PCT/JP2019/046647
§ 371 (c)(1),
(2) Date: May 18, 2021

(87) PCT Pub. No.: WO2020/111199
PCT Pub. Date: Jun. 4, 2020

(65) Prior Publication Data
US 2022/0016916 A1   Jan. 20, 2022

(30) Foreign Application Priority Data

Nov. 30, 2018  (JP) ................. 2018-225977
Oct. 21, 2019   (JP) ................. 2019-192230

(51) Int. Cl.
*B41J 25/00*   (2006.01)
*B41M 7/00*   (2006.01)

(52) U.S. Cl.
CPC .......... *B41J 25/006* (2013.01); *B41M 7/0081* (2013.01)

(58) Field of Classification Search
CPC .............. B41J 11/00214; B41J 11/0015; B41J 11/00212; B41J 11/0021; B41J 11/00218;
(Continued)

(56) References Cited

U.S. PATENT DOCUMENTS

2009/0322804 A1   12/2009   Usuda et al.
2011/0310204 A1   12/2011   Ohnishi
(Continued)

FOREIGN PATENT DOCUMENTS

JP   2006-015691 A   1/2006
JP   2012-236356 A   12/2012
(Continued)

OTHER PUBLICATIONS

Extended European Search Report dated Nov. 17, 2021 issued in corresponding European Appln. No. 19889708.4.
(Continued)

*Primary Examiner* — John Zimmermann
(74) *Attorney, Agent, or Firm* — Harness, Dickey & Pierce, P.L.C.

(57) ABSTRACT

A liquid ejection device includes: a move control unit configured to move any one of a first element and a second element in a main-scanning direction and a sub-scanning direction orthogonal to the main-scanning direction, the first element including a plurality of ejectors to eject active energy ray curable liquid and an active energy ray irradiator, the second element including an object to which the liquid is ejected; and a control unit configured to perform control to cause a first ejector to eject a first ejection amount of liquid, cure the first ejection amount of liquid, cause a second ejector to eject a second ejection amount of liquid onto the cured first ejection amount of liquid, and cure the
(Continued)

second ejection amount of liquid. The first ejection amount and the second ejection amount are different from each other.

15 Claims, 9 Drawing Sheets

(58) Field of Classification Search
CPC . B41J 2/01; B41J 2/2052; B41J 2/2114; B41J 19/142; B41M 7/0081; G06K 15/1881; G06K 15/102

See application file for complete search history.

(56) References Cited

U.S. PATENT DOCUMENTS

| | | | |
|---|---|---|---|
| 2012/0069073 A1 | 3/2012 | Usuda et al. | |
| 2012/0281049 A1 | 11/2012 | Kachi | |
| 2012/0287190 A1 | 11/2012 | Shimada | |
| 2012/0293593 A1* | 11/2012 | Kondo | B41J 2/2114 347/102 |
| 2013/0271541 A1* | 10/2013 | Ohkawa | B41J 11/00218 347/102 |
| 2016/0243820 A1 | 8/2016 | Yanaka et al. | |
| 2016/0288490 A1 | 10/2016 | Okajima et al. | |
| 2016/0295077 A1 | 10/2016 | Kakutani | |
| 2016/0297210 A1 | 10/2016 | Klemann et al. | |
| 2017/0013172 A1 | 1/2017 | Shibasaki | |
| 2017/0072706 A1 | 3/2017 | Okawa | |
| 2019/0275810 A1 | 9/2019 | Matsuki et al. | |

FOREIGN PATENT DOCUMENTS

| | | |
|---|---|---|
| JP | 5421323 | 11/2013 |
| JP | 2015-096316 A | 5/2015 |
| JP | 2015-186918 A | 10/2015 |
| JP | 2016-197827 A | 11/2016 |
| JP | 2017-016648 A | 1/2017 |
| JP | 2018-118508 | 8/2018 |

OTHER PUBLICATIONS

International Search Report dated Feb. 25, 2020 in PCT/JP2019/046647 filed on Nov. 28, 2019.
Japanese Office Action dated May 30, 2023 issued in corresponding Japanese Appln. No. 2019-192230.

* cited by examiner

[Fig. 1]

[Fig. 5]
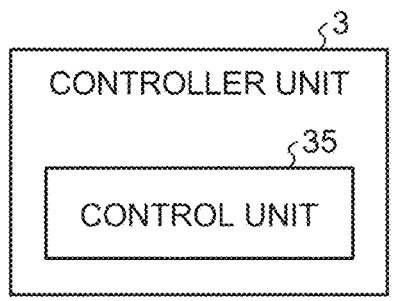
[Fig. 6]
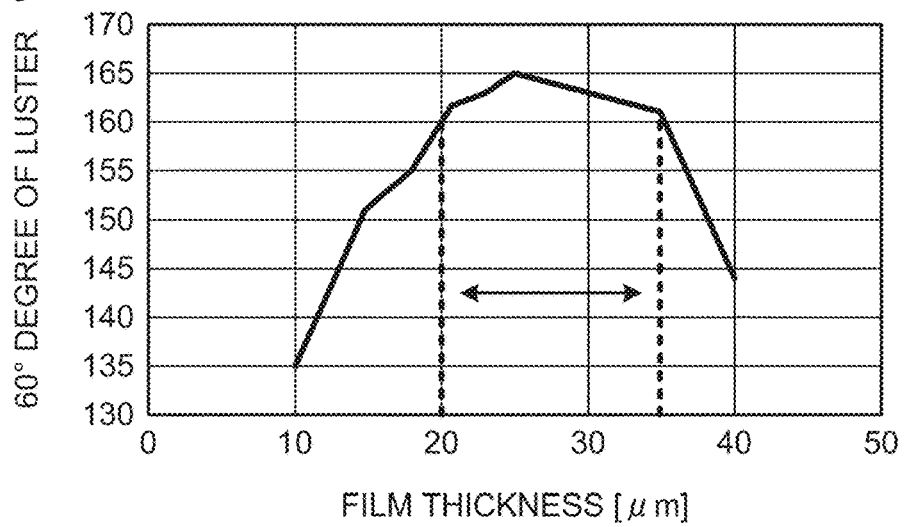
[Fig. 7A]
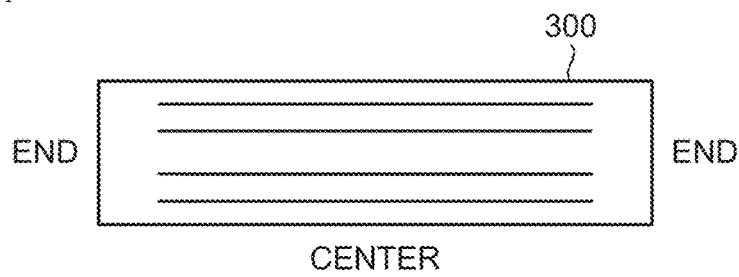
[Fig. 7B]
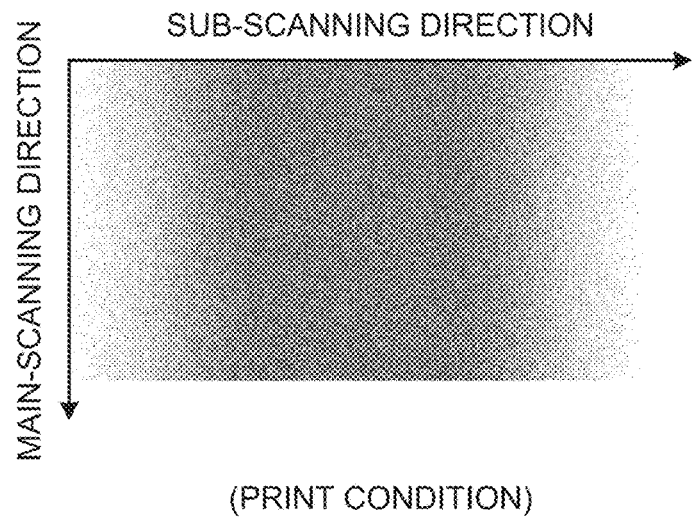

[Fig. 7C]
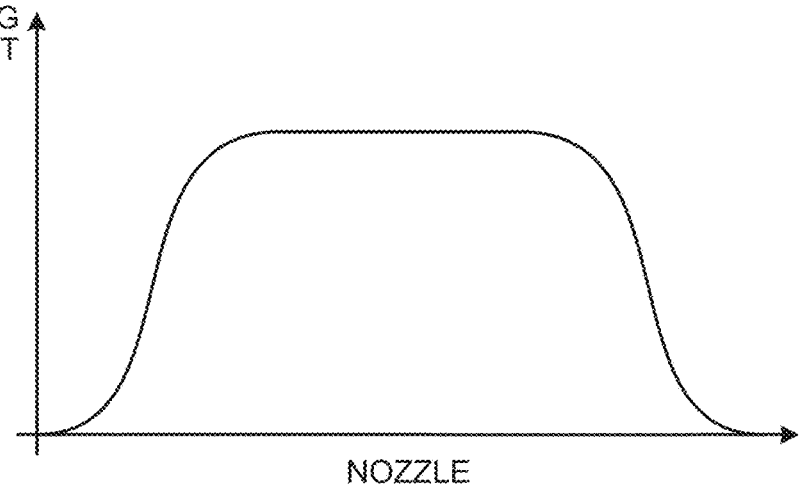
(DENSITY CURVE)
[Fig. 8A]
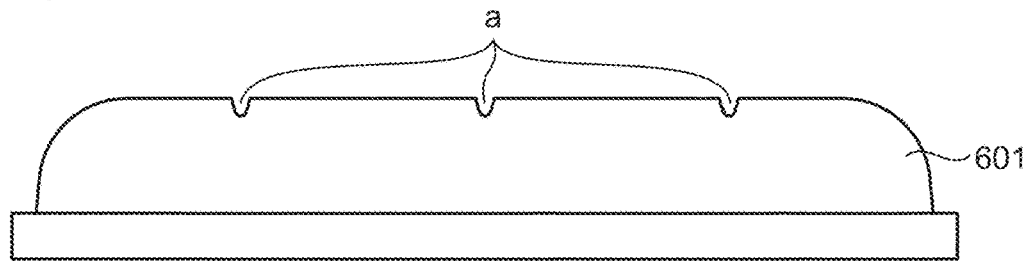
[Fig. 8B]
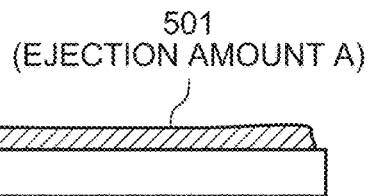
[Fig. 8C]
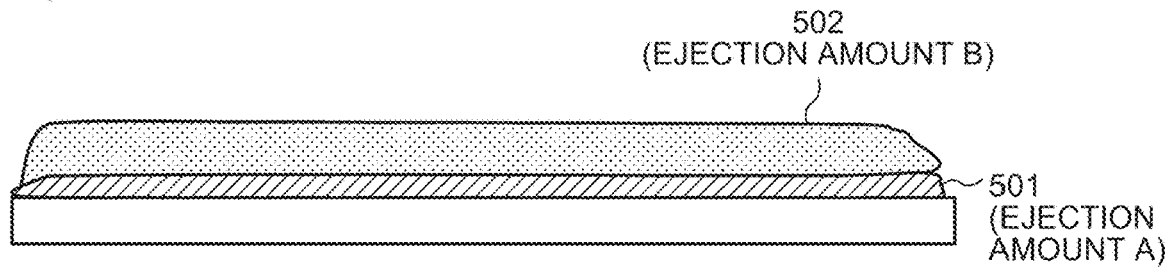
[Fig. 8D]
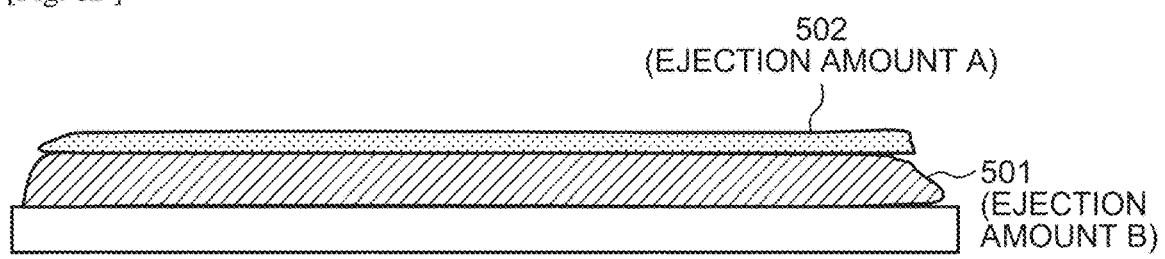

LIQUID EJECTION DEVICE, PROGRAM AND EJECTION CONTROL METHOD

CROSS-REFERENCE TO RELATED APPLICATIONS

This application is a national phase under 35 U.S.C. § 371 of PCT International Application No. PCT/JP2019/046647 which has an International filing date of Nov. 28, 2019, which claims priority to Japanese Patent Application Nos. 2019-192230, filed Oct. 21, 2019, and 2018-225977, filed Nov. 30, 2018 the entire contents of each of which are hereby incorporated by reference.

TECHNICAL FIELD

The present invention relates to a liquid ejection device, a program and an ejection control method.

BACKGROUND ART

An active energy ray curing inkjet system to irradiate active energy ray curable ink with active energy rays (for example, UV light) to cure the active energy ray curable ink has been known. UV ink and electron beam curable ink can be exemplified as active energy ray curable ink. Ultraviolet rays and electron beams can be exemplified as active energy rays.

The active energy ray curing inkjet system includes a method of using both ink containing a colorant (hereinafter, referred to as colored ink) and ink containing no colorant (hereinafter, referred to as clear ink) to form a clear ink layer on a colored ink layer. This method has an advantage in that the clear ink enables improvement in luster of the colored ink and the clear ink covers a medium and thus enables improvement in durability.

In the active energy ray curing inkjet system, for example, when the active energy ray curable ink that is ejected to a medium is cured immediately, the ejected active energy ray curable ink is cured before being leveled (smoothed) so that a mat image/article can be formed.

In the active energy ray curing inkjet system, for example, when the active energy ray curable ink that is ejected onto a medium is cured after a given time elapses, the ejected active energy ray curable ink is cured after being leveled (smoothed) so that an image/article with luster can be formed.

Patent Literature 1 discloses a technique to tentatively cure color ink (colored ink) such that color ink droplets having landed are prevented from interfering with one another and spread to a given size and to then control the amount of light to be emitted by an irradiator to form a mat image with low luster. Patent Literature 1 discloses a technique to control an amount of light to be emitted by the irradiator to form a texture with gloss having luster increased with clear ink. Patent Literature 1 also discloses a technique to, after clear ink is sufficiently spread, emit UV light with high intensity (for example, between 150 millijoules per square centimeter and 300 millijoules per square centimeter inclusive) from a light source that is arranged on a downstream side in a direction in which a recording medium is conveyed to a printing unit, thereby curing a colored ink layer and a clear ink layer completely.

SUMMARY OF INVENTION

Technical Problem

In order to produce gloss (high luster), increasing the film thickness of the clear ink layer is advantageous. In the case where the thickness of the clear ink layer is increased, when UV light with high intensity is emitted, a boundary between a cured area and an area not sufficiently cured tends to appear as a luster line.

The luster line degrades the quality of image/article and this is a fatal disadvantage when a colored ink layer is coated with a clear ink in order to form an image/article with luster.

The present invention was made in view of the above-described circumstances and this is an object of the present invention to provide a liquid ejection device, a program and an ejection control method that enable high luster while inhibiting luster lines.

Solution to Problem

According to an aspect of the present invention, a liquid ejection device includes a plurality of ejectors, an active energy ray irradiator, a move control unit, and a control unit. The plurality of ejectors are configured to eject active energy ray curable liquid. The active energy ray irradiator is configured to emit an active energy ray to the liquid ejected by the plurality of ejectors. The move control unit is configured to move any one of a first element and a second element in a main-scanning direction, and move any one of the first element and the second element in a sub-scanning direction orthogonal to the main-scanning direction, the first element including the plurality of ejectors and the active energy ray irradiator, the second element including an object to which the liquid is ejected. The control unit is configured to perform control to cause a first ejector of the plurality of ejectors to eject a first ejection amount of liquid, cure the first ejection amount of liquid, cause a second ejector of the plurality of ejectors to eject a second ejection amount of liquid onto the cured first ejection amount of liquid, and cure the second ejection amount of liquid. The first ejection amount and the second ejection amount are different from each other.

Advantageous Effects of Invention

According to the present invention, an effect that it is possible to realize high luster while inhibiting luster lines is fulfilled.

BRIEF DESCRIPTION OF DRAWINGS

FIG. 5 is a block diagram illustrating an exemplary functional configuration that is fulfilled by a controller unit of the liquid ejection device.

FIG. 6 is a diagram exemplarily illustrating a relationship between the film thickness and the degree of luster in the case where two heads for clear ink form an image of a clear ink layer by the same amounts of ejection.

FIG. 7A is a diagram exemplarily illustrating a relationship among a positional relationship between the heads.

FIG. 7B is a diagram exemplarily illustrating a printing condition.

FIG. 7C is a diagram exemplarily illustrating a density curve at the time when one-scan printing is performed using a print mask.

FIG. 8A is a schematic diagram exemplarily illustrating formation of a clear ink layer.

FIG. 8B is a schematic diagram exemplarily illustrating formation of the clear ink layer.

FIG. 8C is a schematic diagram exemplarily illustrating formation of the clear ink layer.

FIG. 8D is a schematic diagram exemplarily illustrating formation of the clear ink layer.

DESCRIPTION OF EMBODIMENTS

Embodiments of a liquid ejection device, a program and an ejection control method will be described in detail below with reference to the accompanying drawings. In the present embodiment, an image forming device that ejects ink (liquid) from heads to form an image on a medium is used as the liquid ejection device; however, embodiments are not limited to this and, needless to say, a solid fabrication device that ejects ink (liquid) from head to make a fabrication on a medium is also usable.

First Embodiment

Figure 1:
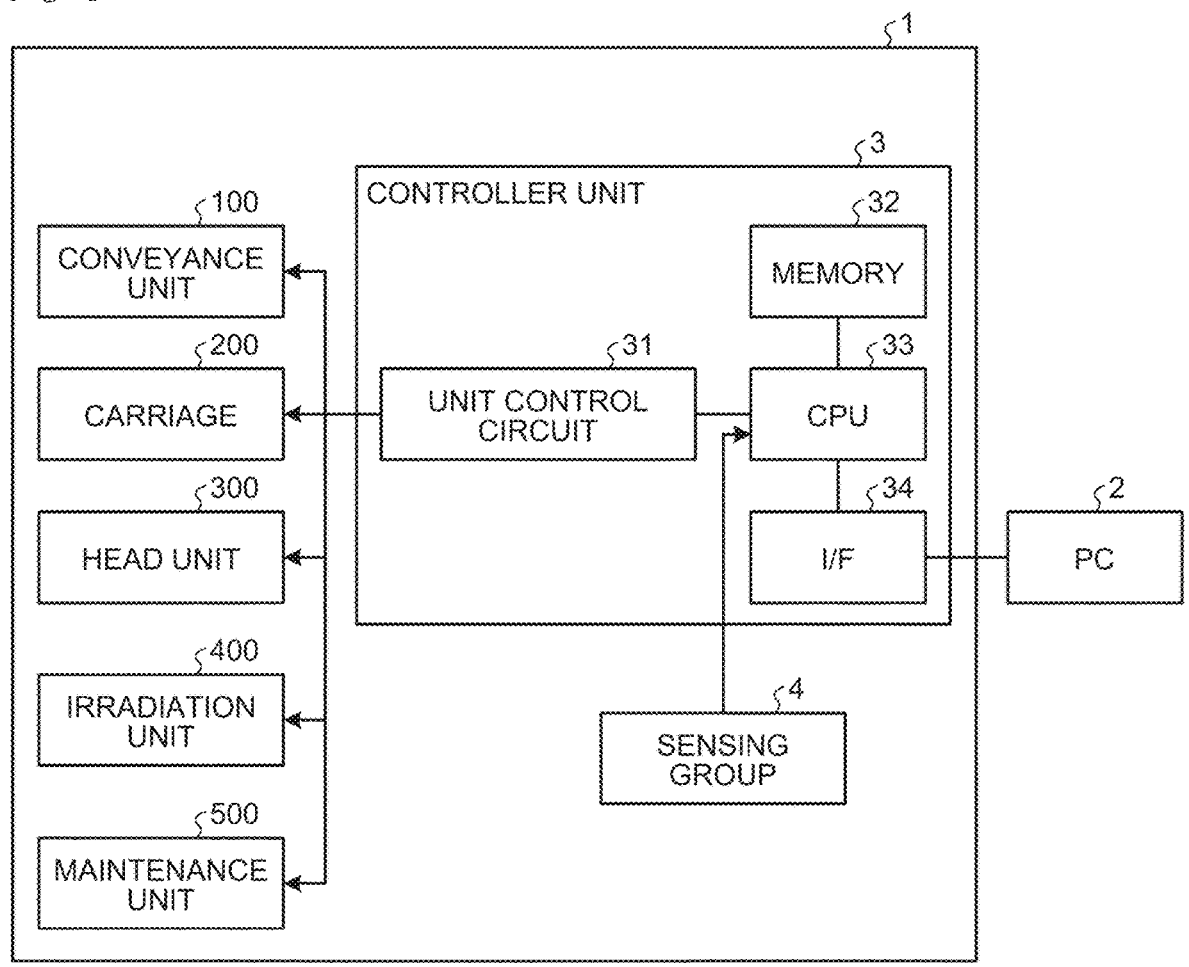
FIG. 1 is a block diagram illustrating a hardware configuration of a liquid ejection device according to a first embodiment.
Figure 2:
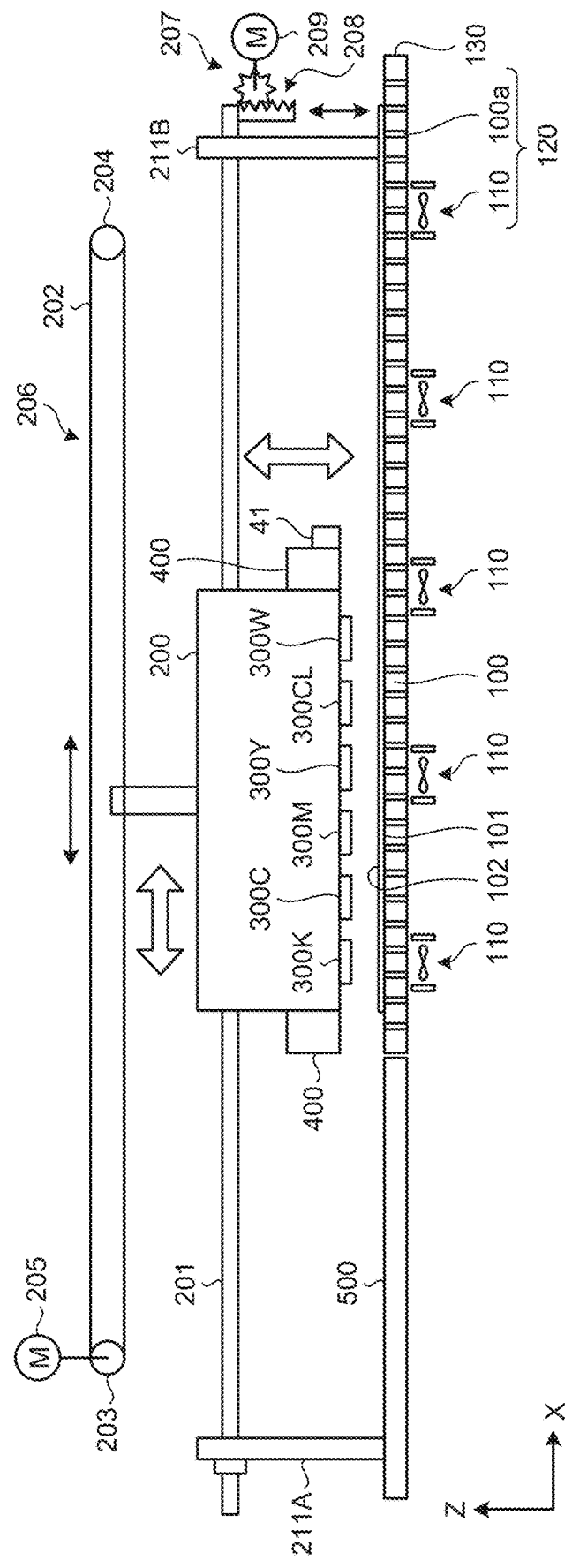
FIG. 2 is a front view schematically illustrating the liquid ejection device.
Figure 3:
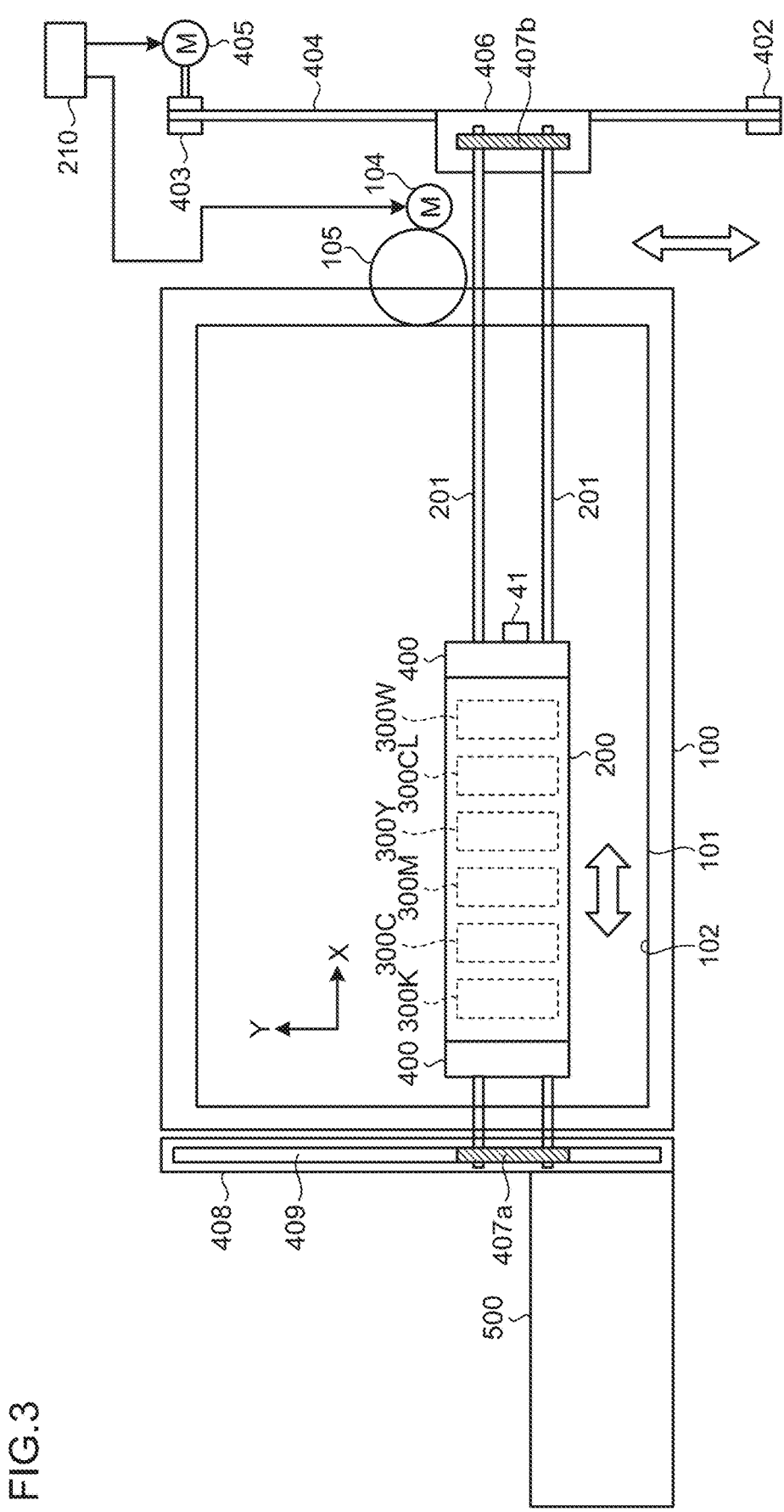
FIG. 3 is a plane view schematically illustrating the liquid ejection device.

FIG. 1 is a block diagram illustrating a hardware configuration of a liquid ejection device 1 according to a first embodiment, FIG. 2 is a front view schematically illustrating the liquid ejection device 1, and FIG. 3 is a plane view schematically illustrating the liquid ejection device 1.

As illustrated in FIG. 1, the liquid ejection device 1 according to the present embodiment includes a controller unit 3, a sensing group 4, a conveyance unit 100 that is a conveyer, a carriage 200, a head unit 300 (an exemplary liquid ejection head), and an irradiation unit 400 (an exemplary active energy ray irradiator), and a maintenance unit 500.

The controller unit 3 has a computer configuration and includes a unit control circuit 31, a memory 32 that stores various types of data, a CPU (Central Processing Unit) 33 that is a main control constituent, and an interface (I/F) 34.

The unit control circuit 31 controls operations of each unit (the conveyance unit 100, the carriage 200, the head unit 300, the irradiation unit 400, and the maintenance unit 500) of the liquid ejection device 1.

The I/F 34 is an interface for connecting the liquid ejection device 1 with an external PC (Personal Computer) 2. Connection between the liquid ejection device 1 and the PC 2 may be in any mode and, for example, a mode of connection therebetween via a network or a direct connection therebetween via a communication cable are exemplified.

The sensing group 4 includes, for example, various sensors of the liquid ejection device 1, such as a level sensor 41 illustrated in FIGS. 2 and 3.

The memory 32 stores various programs that are executable by the CPU 33 and data. For example, an optical, magnetic, or electric recording medium, such as a hard disk, a CD-ROM or a DVD-ROM, is usable as the memory 32.

Various programs are stored in a data mode such that the programs are readable by the CPU 33.

Various programs to be executed by the liquid ejection device 1 according to the embodiment are recorded in a computer-readable recording medium, such as a CD-ROM, a flexible disk (FD), a CD-R, or a DVD (Digital Versatile Disk), in a file in an installable form or an executable form and are provided.

Various programs to be executed by the liquid ejection device 1 according to the embodiment may be configured to be stored in a computer that is connected to a network, such as the Internet, and downloaded to be provided. The various programs to be executed by the liquid ejection device 1 according to the present embodiment may be configured to be provided or distributed via a network, such as the Internet.

The CPU 33 of the controller unit 3 controls operations of each unit (the conveyance unit 100, the carriage 200, the head unit 300, the irradiation unit 400, and the maintenance unit 500) of the liquid ejection device 1 via the unit control circuit 31 using the memory 32 as a work area. Specifically, the CPU 33 controls operations of each unit (the conveyance unit 100, the carriage 200, the head unit 300, the irradiation unit 400, and the maintenance unit 500) based on recording data that is received from the PC 2 and data that is sensed by the sensing group 4 and, as illustrated in FIG. 2, forms an image that is a liquid-applied surface 102 on a base 101 (an exemplary medium) to which an ejection is made.

Note that a printer driver is installed in the PC 2 and the printer driver enables generation of recording data to be transmitted to the liquid ejection device 1 from image data. The recording data contains command data to cause the conveyance unit 100 of the liquid ejection device 1, etc., to operate and pixel data on the image (the liquid-applied surface 102). The pixel data consists of 2-bit data per pixel and is expressed by four tones.

As illustrated in FIG. 2, the conveyance unit 100 includes a stage 130 and an attraction mechanism 120. The attraction mechanism 120 includes a fan 110 and a plurality of attraction holes 100a. The attraction mechanism 120 drives the fan 110 to attract the base 101 to the attraction holes 100a, thereby temporarily fixing the base 101 to the conveyance unit 100. The attraction mechanism 120 may attract a paper sheet by electrostatic attraction.

The conveyance unit 100 moves in a Y-axis direction (a sub-scanning direction) according to control based on a drive signal from the CPU 33 via the unit control circuit 31.

As illustrated in FIG. 3, the conveyance unit 100 includes a conveyance control unit 210, a roller 105, and a motor 104. The conveyance control unit 210 drives the motor 104 to rotate the roller 105, thereby moving the base 101 in the Y-axis direction (the sub-scanning direction).

The conveyance unit 100 may move not the base 101 but the carriage 200 in the Y-axis direction (the sub-scanning direction). In other words, the conveyance unit 100 moves the base 101 and the carriage 200 relatively in the Y-axis direction (the sub-scanning direction Y).

As illustrated on the right in FIG. 3, the conveyance unit 100 includes a side plate 407b that supports two guides 201 that guide the carriage 200 in an X-axis direction (a main-scanning direction X), a stand 406 that supports the side plate 407b, a belt 404 that is fixed to the stand 406, a drive pulley 403 and a driven pulley 402 around and between which the belt 404 is stretched, and a motor 405 that drives the drive pulley 403 to rotate.

As illustrated on the left in FIG. 3, the conveyance unit 100 includes a side plate 407a that supports the two guides 201 that guides the carriage 200 in the X-axis direction (the main-scanning direction X), a stand 408 that supports the side plate 407a such that the side plate 407a is slidable, and a groove 409 that guides the side plate 407a in the sub-scanning direction Y.

In the conveyance unit 100, the conveyance control unit 210 drives the motor 405 to rotate the drive pulley 403, thereby moving the belt 404 in the Y-axis direction (the sub-scanning direction Y). The stand 406 on which the carriage 200 is supported moves in the Y-axis direction (the sub-scanning direction Y) together with move of the belt 404, thereby enabling the carriage 200 to move in the Y-axis direction (the sub-scanning direction Y). The side plate 407a moves in the Y-axis direction (the sub-scanning direction Y) along the groove 409 of the stand 408 with the move of the stand 406 in the Y-axis direction (the sub-scanning direction Y).

Move of the carriage 200 in a Z-axis direction (a height direction Z) and the X-axis direction (the main scanning direction X) is controlled based on drive signals from the CPU 33 (the unit control circuit 31) that functions as a move control unit.

The carriage 200 moves for scanning in the main scanning direction X (the X-axis direction) along the guides 201. A scanning unit 206 includes a drive pulley 203, a driven pulley 204, a drive belt 202, and a motor 205. The carriage 200 is fixed to the drive belt 202 that is stretched between and around the drive pulley 203 and the driven pulley 204. The motor 205 drives the drive belt 202 so that the carriage 200 moves leftward and rightward for scanning in the main-scanning direction X. The guides 201 are supported by side walls 211A and 211B of the device body. A level adjuster 207 includes a motor 209 and a slider 208. The level adjuster 207 drives the motor 209 to move the slider 208 up and down, thereby moving the guide 201 up and down. The guides 201 moves up and down and accordingly the carriage 200 moves up and down, which enables adjustment of the level at which the carriage 200 is with respect to the base 101.

The head unit 300 is on the bottom surface of the carriage 200. Although details will be given below, the head unit 300 is formed of heads that respectively eject UV-curable inks (exemplary active energy ray curable droplets) for black K, cyan C, magenta M, yellow Y, transparent clear CL, white W, and a primer Pr for basecoat.

Each head of the head unit 300 includes a piezo element (piezoelectric element). When the CPU 33 (the unit control circuit 31) applies a drive signal to the piezo element (piezoelectric element), the piezo element causes contraction motions and the contraction motions cause a change in pressure so that the UV curable ink is ejected to the base 101. Accordingly, the liquid-applied surface 102 (an exemplary liquid-applied surface) is formed on the base 101.

For example, ink containing methacrylate monomer can be exemplified as UV-curable ink preferable to the embodiment. The methacrylate monomer is advantageous in that skin sensitization that is a phenomenon that a rash occurs in the skin because of excessive immune response against a chemical substance and has characteristics that the degree of cure shrinkage is greater than the normal ink.

Figure 4:
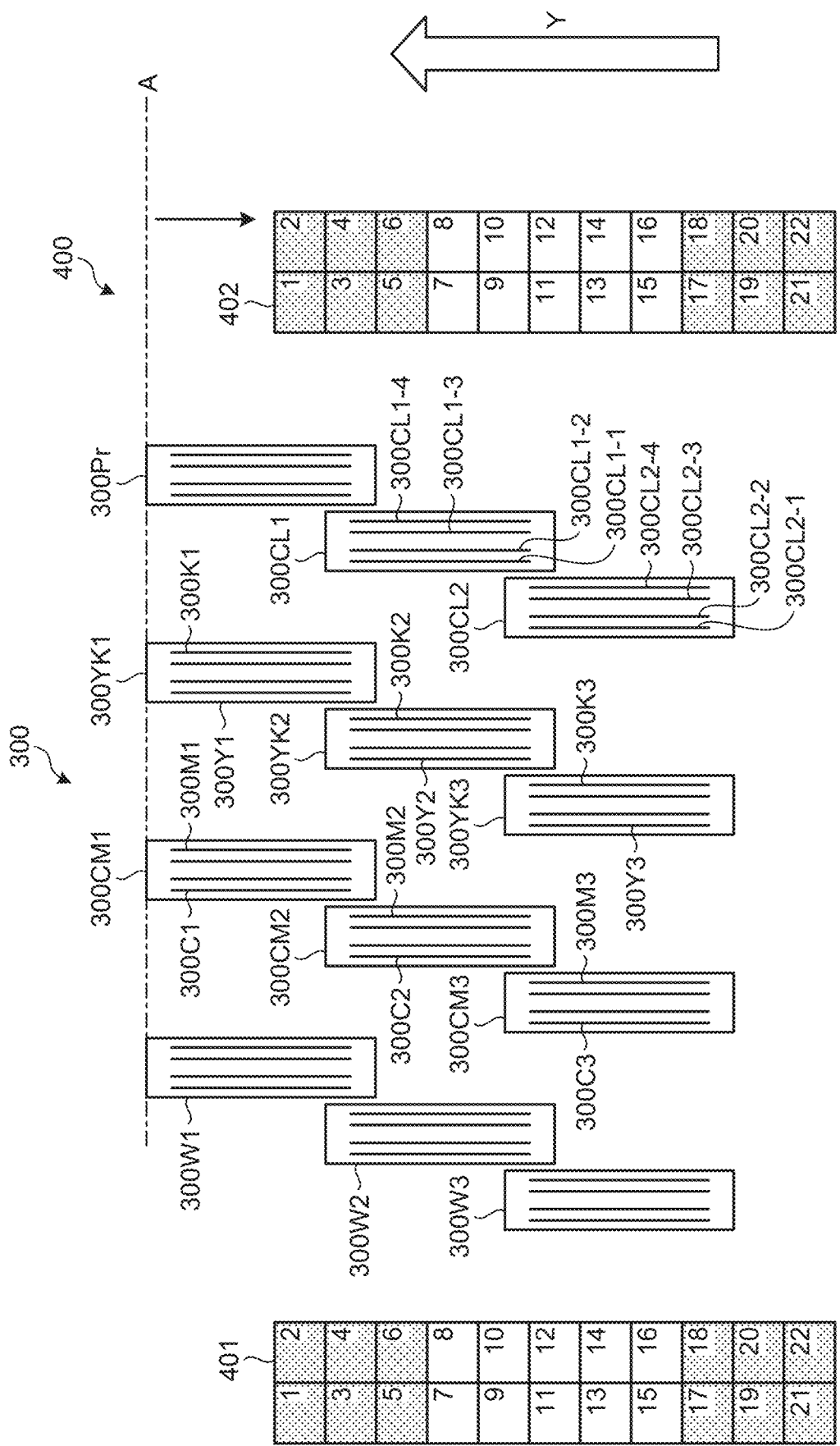
FIG. 4 is a diagram illustrating a configuration of a head unit and an irradiation unit.

FIG. 4 is a diagram illustrating a configuration of the head unit 300 and the irradiation unit 400. As illustrated in FIG. 4, the head unit 300 is formed of 12 heads that are arranged in a lightning shape. The three heads (300W1, 300W2 and 300W3) that are arranged in the lightning shape on the leftmost side in FIG. 4 are heads for white and, among the three heads that are arranged in the lightning shape on the rightmost side in FIG. 4, 300Pr is for primer and 300CL1 and 300CL2 are heads for clear.

The clear heads 300CL1 and 300CL2 are for ejecting clear ink onto a colored ink layer to form superimposed double ink layers in order to realize luster. For this reason, in the present embodiment, the two clear heads 300CL1 and 300CL2 are provided. The clear head 300CL1 serving as a first ejector is provided on a downstream side with respect to the sub-scanning direction Y. The clear head 300CL2 serving as a second ejector is provided obliquely behind the clear head 300CL1 when viewed from the upstream side in the sub-scanning direction.

In the clear head 300CL1, four nozzles 300CL1-1, 300CL1-2, 300CL1-3 and 300CL1-4 are arranged. In the clear head 300CL2, four nozzles 300CL2-1, 300CL2-2, 300CL2-3 and 300CL2-4 are arranged.

The primer Pr that is ejected from the primer head 300Pr is applied to the surface of the base 101 in advance in order for the base 101 and ink with poor adhesion to adhere to each other easily.

Among the six heads that are provided in the lightning shape at the center part, 300CM1, 300CM2, and 300CM3 are heads for cyan and magenta. Four nozzles are arranged in each of the heads and, among them, 300C1, 300C2 and 300C3 are nozzles (two) for cyan and 300M1, 300M2 and 300M3 are nozzles (two) for magenta.

Similarly, among the six heads that are arranged in the lightning shape at the center part, 300YK1, 300YK2, and 300YK3 are heads for yellow and black. Four nozzles are arranged in each of the heads and, among them, 300Y1, 300Y2 and 300Y3 are nozzles (two) for yellow and 300K1, 300K2 and 300K3 are nozzles (two) for black.

Similarly, four nozzles are arranged also in each of the heads for white (300W1, 300W2 and 300W3) and the primer head 300Pr.

The irradiation unit 400 is on a side surface of the carriage 200 (surface in the X-axis direction (the main-scanning direction)). The irradiation unit 400 applies UV light (exemplary active energy ray) based on a drive signal from the CPU 33 (the unit control circuit 31). As illustrated in FIG. 4, the irradiation unit 400 includes UV irradiation devices 401 and 402 formed of a UV irradiation lamp that emits UV light. The UV irradiation devices 401 and 402 are arranged on both ends of the head unit 300. The UV irradiation devices 401 and 402 are formed of blocks 1 to 22 (eleven rows in the sub-scanning direction).

The liquid ejection device 1 performs scanning while ejecting ink from the head unit 300 and the irradiation unit 400 emits UV light every time scanning is performed. In a high-resolution mode, the irradiation unit 400 frequently applies UV light because of a large number of scans so that the UV curable ink is cured before being leveled. For this reason, to effectively perform leveling (smoothing) on the clear ink that is ejected from the clear heads 300CL1 and 300CL2, the UV irradiation devices 401 and 402 are partly turned off.

Specifically, to form a clear ink layer by ejecting clear ink from the clear heads 300CL1 and 300CL2, the liquid ejection device 1 according to the present embodiment turns off the center parts of the UV irradiation devices 401 and 402 in the sub-scanning direction Y, that is, the areas of blocks 7 to 16 (turns on 1 to 6 and 17 to 22). Accordingly, the clear ink that is ejected from the clear head 300CL1 is leveled (smoothed) and then cured, which enables luster.

As illustrated in FIG. 4, when the position of the white head 300W, the cyan-magenta head 300CM1, the yellow-black head 300YK1, and the primer head 300Pr of the head unit 300 that are arranged on the downstream side in the sub-scanning direction Y is A, the UV irradiation devices 401 and 402 are in the position A for normal color image formation. When an image is formed using the clear ink, the UV irradiation devices 401 and 402 are shifted to the upstream side with respect to A and arranged.

The arrangement realizing such a positional relationship is for, when the clear ink is superimposed onto a color image, preventing the color image before being cured and the clear ink ejected from the clear heads 300CL1 and 300CL2 from mixing with each other by curing the clear ink previously.

The functions fulfilled by the liquid ejection device 1 because the CPU 33 of the controller unit 3 of the liquid ejection device 1 executes a program that is stored in the memory 32 will be described.

Part of all the functions fulfilled by the controller unit 3 of the liquid ejection device 1 may be configured using a dedicated processing circuit, such as an IC (Integrated Circuit).

FIG. 5 is a block diagram illustrating an exemplary functional configuration that is fulfilled by the controller unit 3 of the liquid ejection device 1. As illustrated in FIG. 5, the CPU 33 executes the program that is stored in the memory 32 so that the controller unit 3 of the liquid ejection device 1 includes a control unit 35.

The control unit 35 controls image forming operations of the liquid ejection device 1. The image forming operations of the liquid ejection device 1 based on a drive signal from the control unit 35 will be described below.

First of all, the conveyance unit 100 moves in the Y-axis direction (the sub-scanning direction Y) based on a drive signal from the control unit 35 to position the base 101 in an initial position for forming an image (the liquid-applied surface 102).

Based on a drive signal from the control unit 35, the carriage 200 then moves to a level appropriate for the head unit 300 to eject the UV curable ink (for example, the level enabling a gap of 1 mm between the head unit 300 and the base 101). The level sensor 41 senses the level at which the head unit 300 is and accordingly the control unit 35 knows the level.

The carriage 200 reciprocates in the X-axis direction (the main scanning direction X) based on a drive signal from the control unit 35. During the reciprocation, the head unit 300 ejects the UV curable ink based on a drive signal from the control unit 35. Accordingly, an image of one scan (the liquid applied surface 102) is formed on the base 101.

After the image (the liquid applied surface 102) of one scan is formed on the base 101, the conveyance unit 100 moves for one scan in the Y-axis direction (the sub-scanning direction) based on a drive signal from the control unit 35.

Until formation of the image (the liquid applied surface 102) completes, an operation for forming an image (the liquid applied surface 102) of one scan and an operation for moving the conveyance unit 100 for one scan in the Y-axis direction (the sub-scanning direction Y) (hereinafter, a scan operation) are performed alternately.

The number of times for which the scan operation is performed differs depending on the resolution and, for low resolution, the number of scans is small and, for high resolution, the number of scans increases.

When forming an image (the liquid-applied surface 102) on the base 101 completes, the UV curable ink is leveled (smoothed), holds for a time during which the UV curable ink wet-spreads (referred to as "leveling time" below), and thereafter is irradiated by the irradiation unit 400 with UV light. Normally, the irradiation unit 400 emits UV light when the carriage 200 moves to the above-described level appropriate for the head unit 300 to eject the UV curable ink and reciprocates in the X-axis direction (the main-scanning direction X).

Image formation with clear ink according to the present embodiment will be described in detail.

As described above, the head unit 300 includes two heads that are the head 300CL1 for clear ink and the head 300CL2 for clear ink. To form a clear ink layer on a color image in a 1-job mode, the liquid ejection device 1 forms a color image using the cyan-magenta head 300CM1 and the yellow-black head 300YK1. A clear ink layer is then formed and, first of all, while ejecting the clear ink using the clear ink head 300CL1 on the downstream side, the liquid ejection device 1 emits UV light using the irradiation unit 400.

The liquid ejection device 1 gradually cures the ink while repeating the scan operation by the ejection and emission of UV light for few times.

The liquid ejection device 1 then repeatedly performs the clear ink ejection using the clear ink head 300CL2 on the upstream side and UV light emission using the irradiation unit 400 for few times, thereby completely curing the ink to form a final image.

As described above, four nozzles are provided in each of the clear ink head 300CL1 and the clear ink head 300CL2. The four nozzles 300CL1-1, 300CL1-2, 300CL1-3 and 300CL1-4 in the clear ink head 300CL1 perform ejection. The four nozzles 300CL1-1, 300CL1-2, 300CL1-3 and 300CL1-4 in the clear ink head 300CL2 perform ejection.

The system to form a clear ink layer on a color image is not limited to the 1-job mode, and a clear ink layer may be formed by two jobs. In this case, in the first job, a color image is preferably formed using the cyan-magenta head 300CM1, the yellow-black head 300YK1, the cyan-magenta head 300CM2, the yellow-black head 300YK2, the cyan-magenta head 300CM3, and the yellow-black head 300YK3 and, in the second job, a clear ink layer is preferably formed using the clear ink head 300CL1 and the clear ink head 300CL2.

FIG. 6 is a diagram exemplarily illustrating a relationship between the film thickness and the degree of luster in the case where the two clear ink heads 300CL1 and 300CL2 form an image of a clear ink layer by the same amounts of ejection.

When an image of a clear ink layer is formed using the clear ink, a small film thickness of the clear ink layer may cause unevenness in film thickness and hinder light from reflecting, thereby inhibiting the degree of luster. On the other hand, increasing the thickness by increasing the amount of clear ink to be ejected tends to increase the degree of luster but, when the thickness is over a given range, leveling (smoothing) cannot be performed sufficiently and inversely the degree of luster lowers.

According to the data represented in FIG. 6, a clear ink layer having a film thickness of 15 μm or smaller cause poor light reflection and thus has a low degree of luster. It is preferable that the degree of luster be in a range from 20 to 35 μm and, when the film thickness of the clear link layer is over 40 μm, the degree of luster lowers and furthermore the luster line is distinct.

To deal with this, the liquid ejection device 1 of the present embodiment realizes luster and luster lines using different amounts of ink to be ejected from the two clear ink heads 300CL1 and 300CL2. An inkjet recording system completes an image by performing scanning operations for multiple times and image data per scan is generated using a print mask function. In the present embodiment, using a tool to change the parameter of the print mask function, a study on the optimum ink jetting amount, that is, the optimum amount of ink to be ejected is carried out.

The print mask function has a line plot or a S-curved gradation shape. This aims at reducing bidirectional binding that occurs in bidirectional printing. Bidirectional banding occurs because the order in which dots ejected from the print heads respectively for colors and landing are superimposed switches between the out-bound and in-bound paths. Particularly, in the UV inkjet system, bidirectional banding becomes apparent when the UV irradiation timing changes between the out-bound and in-bound paths.

FIGS. 7A to 7C are diagrams exemplarily illustrating a relationship among a positional relationship between the heads, a printing condition, and a density curve at the time when one-scan printing is performed using the print mask.

As represented in the density curve in FIG. 7C, the jetting amount is small at both ends of head nozzles and the jetting amount is increased toward the center of head nozzles, which forms gradations at the ends of the head. In other words, the probability with which nozzles corresponding to areas around both ends of the clear ink heads 300CL1 and 300CL2 are used is kept lower than the probability with which nozzles corresponding to other areas are used. Accordingly, uneven upper and lower end areas of the print mask function complement each other, enabling formation of an even image and prevention of unevenness in luster occurring at the ends of head nozzles.

When thick ink and light ink are used in a liquid ejection device, such as an ink-jet printer, a continuous tone image may be converted into a tone signal (ternary to four-valued) other a binarization tone signal and, in that case, tone conversion is also required.

The tone conversion is referred to as screening and dithering, density patterning, and pixel assignment methods are known as methods for screening. Widely-practiced one of them is dithering. Dithering can be divided into conditional determination methods and independent determination methods, and an error diffusion method among the conditional determination methods is one of the most widely practiced methods.

In screening where an input tone is converted into a multi-valued tone or a binary tone, particularly, texture that occurs on the highlight side is a cause of decrease in image quality.

The liquid ejection device 1 of the embodiment employs a blue noise mask method using a pattern where texture is less distinct for pixel arrangement on a highlight side. Controlling the amount of clear ink to be ejected using the blue noise characteristics of the mask generation pattern enables use of a pattern where texture is less distinct in advance for the pixel arrangement on the highlight side and thus prevent unevenness in luster.

Formation of a clear ink layer will be described in detail below.

FIGS. 8A to 8D are schematic diagrams exemplarily illustrating formation of a clear ink layer. As described above, in order to realize luster, increasing the amount of ink to be ejected is advantageous; however, when a large amount of clear ink is ejected at a time, as illustrated in FIG. 8A, a clear ink layer 601 cannot be leveled (smoothed). For this reason, the clear ink layer 601 illustrated in FIG. 8A leads to mat image quality. The clear ink layer 601 illustrated in FIG. 8A has a large film thickness and therefore, when the clear ink layer 601 is cured by being irradiated with UV light, boundaries a each between a cured part and an insufficiently cured part tends to appear as luster lines.

To deal with this, the CPU 33 of the controller unit 3 of the liquid ejection device 1 of the present embodiment performs control such that the clear ink head 300CL1 ejects a small amount of clear ink (A is the ejection amount) to form a clear ink layer 501 as illustrated in FIG. 8B. The clear ink layer 501 thus formed is in a small amount (A is the ejection amount) and thus, as illustrated in FIG. 8B, is leveled (smoothened) evenly.

In this case, the clear ink layer 501 has a small thickness and it is therefore difficult to obtain luster but it is possible cure the clear ink layer 501 evenly. Furthermore, an amount of ultraviolet ray (active energy ray) smaller than that under a normal image formation condition on ink containing a colorant is required and this enables control such that the amount of ultraviolet ray emitted by the irradiation unit 400 when the clear ink head 300CL1 forms the clear ink layer 501 (thin layer) is smaller than that under the normal image formation condition on the ink containing a colorant and thus enables further inhibition of luster lines.

As illustrated in FIG. 8C, the first control unit 35 of the liquid ejection device 1 performs control such that the clear ink head 300CL2 ejects the clear ink to additionally form a clear ink layer 502 on the clear ink layer 501 having been leveled (smoothened). The control unit 35 of the liquid ejection device 1 performs control to meet the relation, the ejection amount A<an ejection amount B, where B is the amount of clear ink ejected by the clear ink head 300CL2.

As described above, the liquid ejection device 1 using the UV inkjet system for curing by UV irradiation by the irradiation unit 400 performs ink ejection and emission of UV light while performing scanning. When the clear ink head 300CL2 ejects the clear ink, the clear ink layer 501 that is formed by the clear ink head 300CL1 is semi-cured and not completely cured and therefore the angle of contact is small and ink droplets tend to spread (well wetted). For this reason, compared to the case where the clear ink is ejected from the clear ink head 300CL2 directly to the base 101, leveling (smoothing) is easily performed, which makes it possible to realize high luster and also prevent luster lines.

On the other hand, when the clear ink in an ejection amount (A+B) is ejected at a time by only one head, the amount of clear ink to be ejected at a time is larger than that in the case where the clear ink is ejected using the two heads separately and thus leveling is not performed easily. Needless to say, the film thickness is larger than those in the case where the clear ink layers are formed in the ejection amount A and the ejection amount B by the two heads and thus luster lines tend to occur. In this respect, the control unit 35 of the liquid ejection device 1 of the present embodiment performs control such that the clear ink is ejected in two stages separately in a way that the clear ink head 300CL1 ejects the ejection amount A and the clear ink head 300CL2 ejects the ejection amount B. Accordingly, the clear ink is leveled (smoothened) evenly, thereby causing no boundary between a cured area and an area not sufficiently cured.

Inversely, the amounts of clear ink to be ejected may meet the ejection amount A>the ejection amount B. In other words, as illustrated in FIG. 8D, the amount A of clear ink ejected by the clear ink head 300CL1 is larger than the amount B of clear ink ejected by the clear ink head 300CL2. In this case, the clear ink layer 501 that is formed of the clear ink ejected from the clear ink head 300CL1 is formed into a film thickness that causes no luster line. In other words, the control unit 35 of the liquid ejection device 1 performs control such that the clear ink layer 502 is formed of the clear ink that is additionally ejected from the clear ink head 300CL2 onto the clear ink layer 501. The clear ink layer 502 is a thin layer having a film thickness smaller than the clear ink layer 501 and thus is leveled (smoothed) easily, which makes it possible to realize high luster while inhibiting luster lines.

In this case, in the liquid ejection device 1, it is also possible to perform control to control the amount of ultraviolet to be emitted by the irradiation unit 400 when the clear ink head 300CL2 forms the clear ink layer 502 (thin layer) such that the amount is lower than that under the normal image formation condition, which makes it possible to further inhibit luster lines.

As described above, according to the present embodiment, the ejection amount A of the clear head 300CL1 serving as a first inkjet nozzle that ejects clear ink and the ejection amount B of the clear head 300CL2 serving as a second inkjet nozzle that ejects clear ink and that is arranged on the upstream side with respect to the clear head 300CL1 in the sub-scanning direction Y are different from each other.

When the ejection amount A<the ejection amount B, a thin layer is formed by the clear head 300CL1 serving as the first inkjet nozzle of the smaller ejection amount and, because the formed clear ink layer is of a small amount, the clear ink layer can be cured evenly. Onto the clear ink layer, the clear ink of the ejection amount B larger than the ejection amount A is ejected from the clear head 300CL2 serving as the second inkjet nozzle. In this case, the clear ink layer that is formed by the clear head 300CL1 serving as the first inkjet nozzle is not completely cured and is semi-cured and therefore has a smaller angle of contact than that obtained when the clear ink is ejected directly onto the base 101 and the ink droplets tend to spread (well-wetted). Accordingly, leveling (smoothing) is performed easily and thus it is possible to realize high luster while inhibiting luster lines.

On the other hand, when the ejection amount A>the ejection amount B, the amount A of clear ink ejected by the clear head 300CL1 is larger than the amount B of clear ink ejected by the clear head 300CL2 and the clear head 300CL1 forms a clear ink layer having a thickness that causes no luster line. The clear head 300CL2 additionally forms a clear ink layer on the clear ink layer formed by the clear head 300CL1 and the additionally formed layer is thin and thus is leveled (smoothed) easily and this makes it possible to realize high luster while inhibiting luster lines.

Modification 1

In the liquid ejection device 1 according to the present embodiment, as described above, the irradiation unit 400 is turned off partly in order to effectively carry out leveling (smoothing) when a clear ink layer is formed.

As illustrated in FIG. 4, the irradiation unit 400 of the present embodiment sets the center parts of the UV irradiation devices 401 and 402, that is, the areas of 7 to 16 as off-areas (1 to 6 and 17 to 22 are on-areas); however, embodiments are not limited to this.

Figure 9:
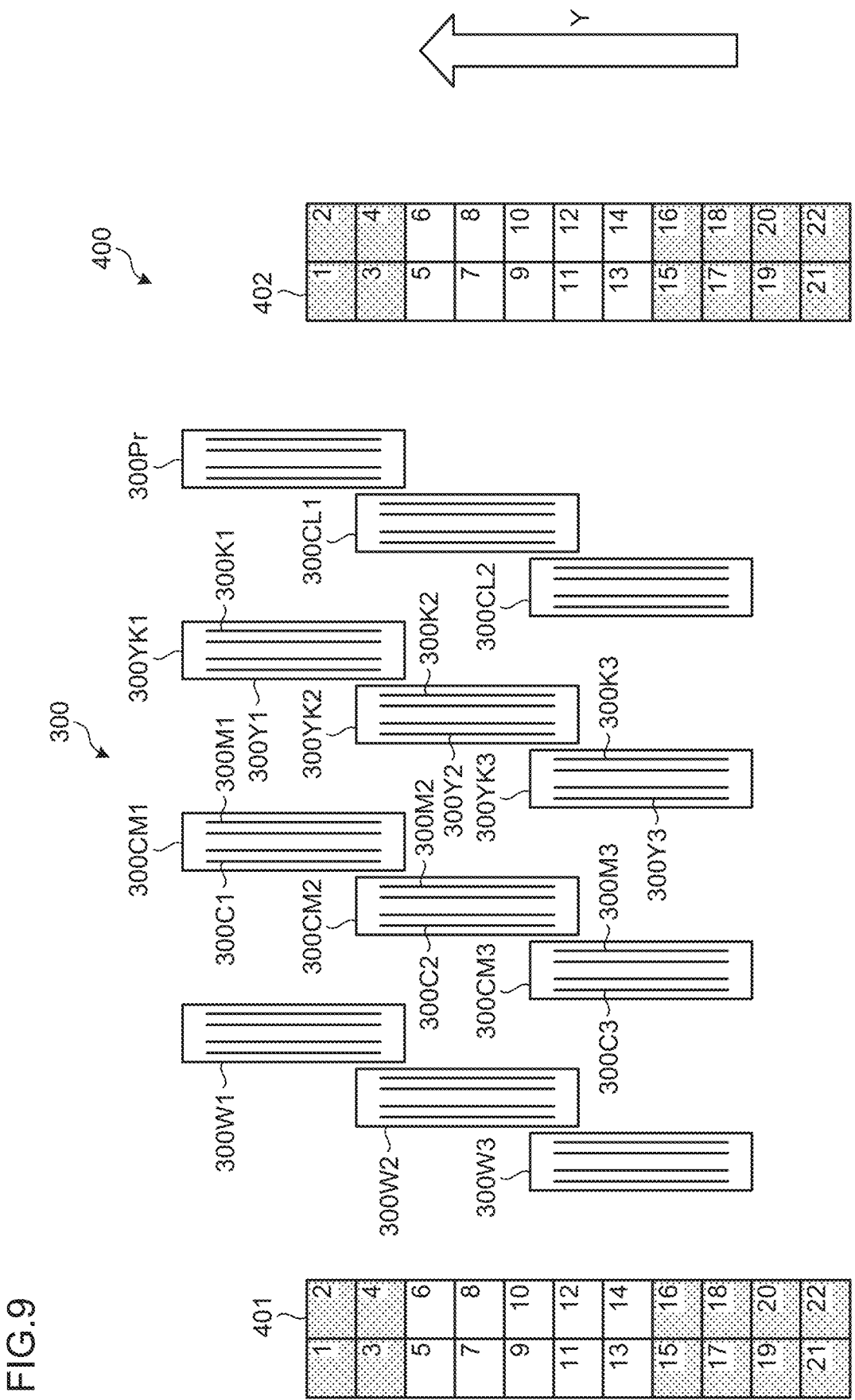
FIG. 9 is a diagram illustrating a configuration of a head unit and an irradiation unit according to Modification 1.

FIG. 9 is a diagram illustrating a configuration of the head unit 300 and the irradiation unit 400 according to Modification 1. As illustrated in FIG. 9, the irradiation unit 400 may set the front to middle parts of the UV irradiation devices 401 and 402 in the sub-scanning direction Y, for example, the parts of 5 to 14 as the off-areas (1 to 4 and 15 to 22 are the on-areas).

In this case, the clear ink that is ejected from the clear ink head 300CL1 that is provided on the downstream side with respect to the UV irradiation devices 401 and 402 in the sub-scanning direction Y is not cured and is leveled (smoothed) easily and therefore it is effective to set the amount of clear ink to be ejected from the clear ink head 300CL1 larger than the amount of clear ink to be ejected from the clear ink head 300CL2.

Modification 2

Figure 10:
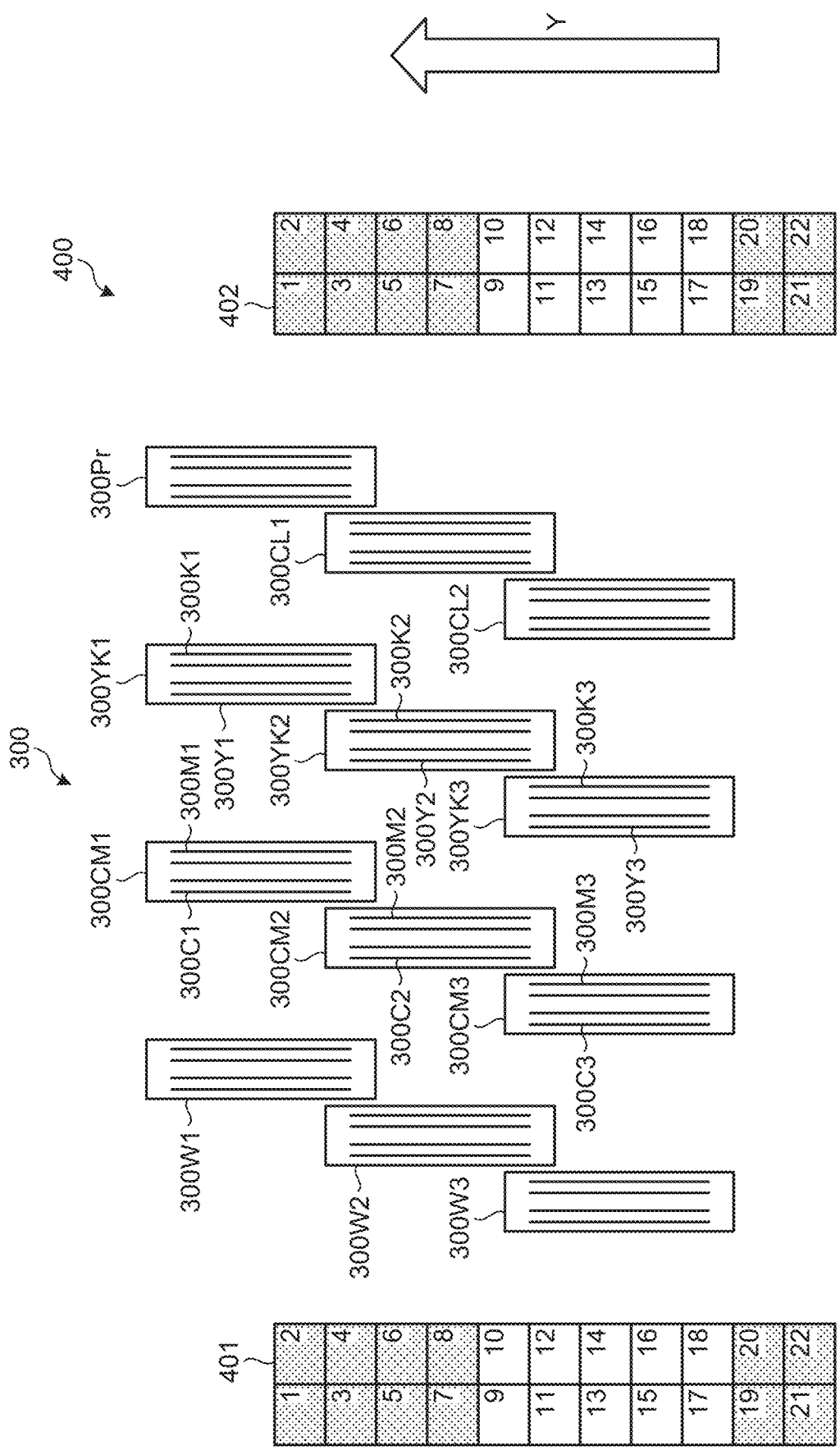
FIG. 10 is a diagram illustrating a configuration of a head unit and an irradiation unit according to Modification 2.

FIG. 10 is a diagram illustrating a configuration of the head unit 300 and the irradiation unit 400 according to Modification 2. As illustrated in FIG. 10, the irradiation unit 400 may set the center to back parts of the UV irradiation devices 401 and 402 in the sub-scanning direction Y, for example, the areas of 9 to 18 as the off-areas (1 to 8 and 19 to 22 are the on-areas).

In this case, the clear ink that is ejected from the clear ink head 300CL1 that is provided on the upstream side with respect to the UV irradiation devices 401 and 402 in the sub-scanning direction Y is not cured and is leveled (smoothed) easily and therefore it is effective to set the amount of clear ink to be ejected from the clear ink head 300CL2 larger than the amount of clear ink to be ejected from the clear ink head 300CL1.

Second Embodiment

A second embodiment will be described next.

A liquid ejection device according to the second embodiment is different from the first embodiment in that clear ink heads that eject clear ink are configured in three rows. Hereinafter, in the description of the second embodiment, description of the same parts as those of the first embodiment will be omitted and points different from the first embodiment will be described.

Figure 11:
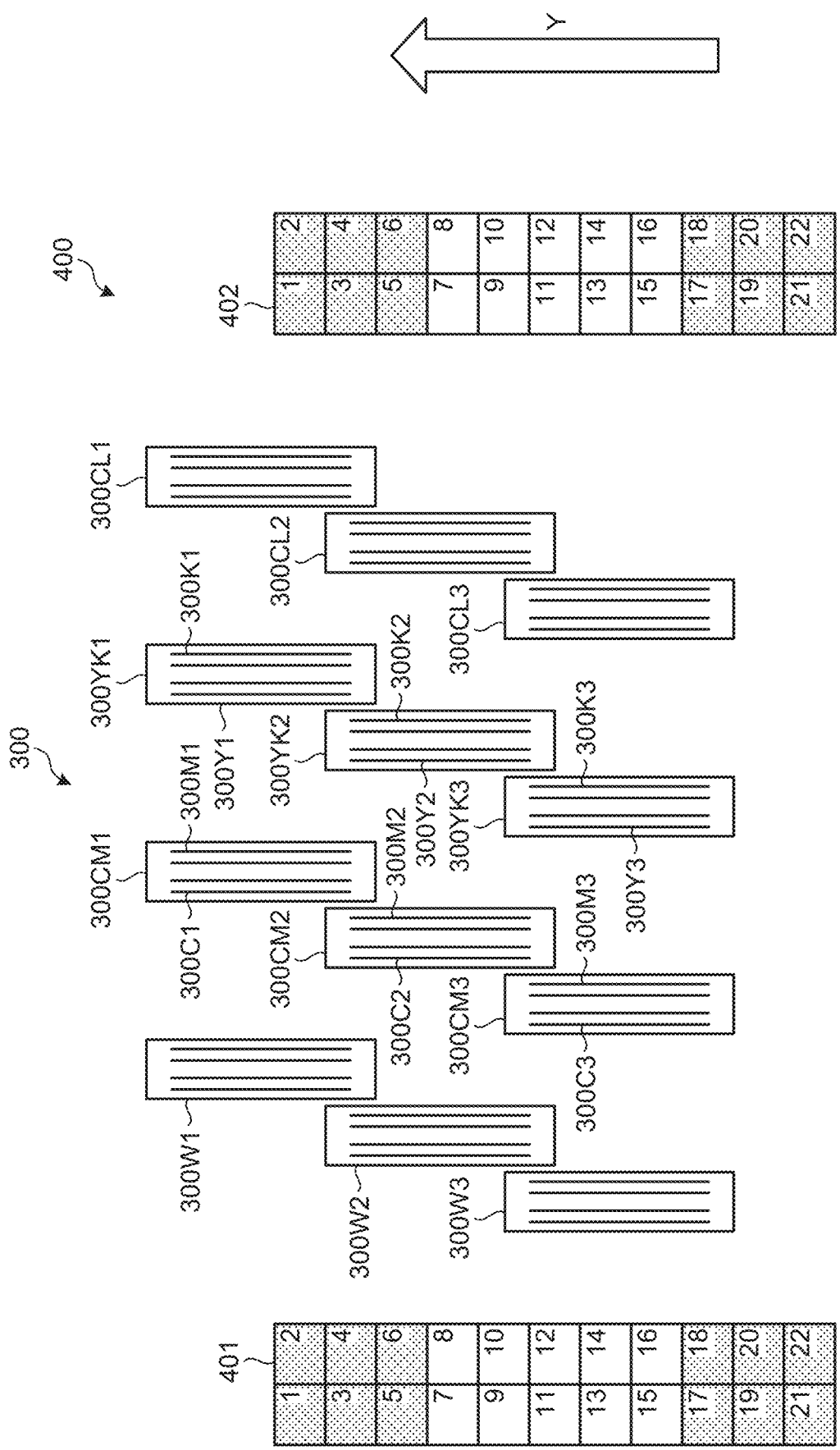
FIG. 11 is a diagram illustrating a configuration of a head unit and an irradiation unit according to a second embodiment.

FIG. 11 is a diagram illustrating a configuration of a head nit and an irradiation unit according to a second embodiment. As illustrated in FIG. 11, in the head unit 300 of the liquid ejection device 1 of the second embodiment, the clear ink head 300CL1 on the downstream side in the sub-scanning direction Y, the clear ink head 300CL2 in the middle, and a clear ink head 300CL3 on the upstream side are arranged in a lightning shape.

In the configuration illustrated in FIG. 11, in the first job, a color image is formed using the cyan-magenta head 300CM1, the yellow-black head 300YK1, the cyan-magenta head 300CM2, the yellow-black head 300YK2, the cyan-magenta head 300CM3 and the yellow-black head 300YK3 and, in the second job, a clear ink layer is formed using the clear ink head 300CL1, the clear ink head 300CL2 and the clear ink head 300CL3.

Also in the case where the clear ink heads are configured in three rows as illustrated in FIG. 11, as in the first embodiment, it is desirable that the control unit 35 set not the same but different amounts of clear ink to be ejected by the respective heads. For example, a relation, the ejection amount A<the ejection amount B<an ejection amount C or the ejection amount A>the ejection amount B>the ejection amount C, is possible, where A is the ejection amount of the clear ink head 300CL1 on the downstream side, B is the ejection amount of the clear ink head 300CL2 in the middle, and C is the ejection amount of the clear ink head 300CL3 on the upstream side.

As described above, according to the present embodiment, meeting the relation of the ejection amount A<the ejection amount B<the ejection amount C or the ejection amount A>the ejection amount B>the ejection amount C, where A is the ejection amount of the clear ink head 300CL1 on the downstream side, B is the ejection amount of the clear ink head 300CL2 in the middle, and C is the ejection amount of the clear ink head 300CL3 on the upstream side, makes it possible to realize high luster while inhibiting luster lines.

In each of the embodiments, a plurality of ejectors that are the clear head 300CL1 serving as the first ejector and the clear head 300CL2 serving as the second ejector are provided; however, embodiments are not limited thereto. For example, a single head may make ejections of the first ejection amount and the second ejection amount.

The "liquid ejection device" herein is a device that includes a liquid ejection head or a liquid ejection unit and that drives the liquid ejection head to eject liquid. The liquid ejection device covers not only devices capable of ejecting liquid to an object to which liquid is attachable but also devices that eject liquid into air or liquid.

The "liquid ejection device" may include a unit relating to feeding, conveying, and paper ejection of an object to which liquid is attachable and further include a preprocessing device and a post-processing device.

For example, there are, as the "liquid ejection device", an image forming device that is a device that ejects ink to form an image on a paper sheet and a solid structure construction device (three-dimensional structure construction device) that ejects a construction liquid onto a powder layer obtained by forming powders into a layer shape in order to construct a solid structure (three-dimensional structure).

The "liquid ejection device" is not limited to devices that visualize a significant image, such as letters or diagram, using liquid that is ejected. For example, a device that forms a pattern that has no meaning, or the like, and a device that constructs a three-dimensional image may be covered.

The "object to which liquid is attachable" means an object to which liquid is at least temporarily attachable, an object to which liquid is attached and adheres, an object to which liquid is attached and into which liquid permeates, or the like. Specific examples include a medium on which a recording is made, such as a paper sheet, a recording sheet, a recording paper sheet, a film, or a cloth; electronic parts, such as an electronic board or a piezoelectric element; or a medium, such as a granular layer (powder layer), an internal organ model, or an examination cell, and all objects to which liquid is attachable are covered unless otherwise specified.

The material of the "object to which liquid is attachable" is preferably a material to which liquid attachable even temporarily, such as paper, thread, fibers, fabric cloth, leather, metal, plastic, glass, wood, ceramics.

The "liquid" is preferably a liquid having a viscosity and a surface tension allowing the liquid to be ejected from the head, and the "liquid" is not particularly limited and preferably has a viscosity of 30 mPa·s or under at a normal temperature and under a normal pressure or by being heated or cooled. More specifically, the "liquid" may be a solution, a suspension, or an emulsion containing a solvent, such as water or or an organic solvent, a colorant, such as a dye or a pigment, a functional material, such as a polymerizable compound, a resin, or a surfactant, a biomaterial, such as DNA, amino acid, protein or calcium, or an edible material, such as a natural colorant, and they are usable for, for example, inkjet ink, a surface treatment solution, a solution for forming components of an electronic element or a light emitting element or an electronic circuit resist pattern, or a three-dimensional construction material solution.

The "liquid ejection device" covers a device in which a liquid ejection head and an object to which liquid is attachable move relatively with each other; however, embodiments are not limited thereto. Specific examples includes a serial type device that moves the liquid ejection head and a line device that does not move the liquid ejection head.

The "liquid ejection device" further covers a processing solution application device that ejects a processing solution to a paper sheet in order to apply the processing solution to the surface of the paper sheet in order to improve the quality of the surface of the paper sheet and a spray granulation device that sprays a composition solution obtained by dispersing a raw material into a solution via a nozzle to form fine particles of the raw material.

REFERENCE SIGNS LIST

1 Liquid ejection device
31, 33 Move control unit
35 Control unit
300CL1 First ejector
300CL1 Second ejector

CITATION LIST

Patent Literature
PTL 1: Japanese Patent No. 5421323

The invention claimed is:

1. A liquid ejection device comprising:
a plurality of ejectors configured to eject active energy ray curable liquid;
an active energy ray irradiator configured to emit an active energy ray to the liquid ejected by the plurality of ejectors;
a move control unit configured to move any one of a first element and a second element in a main-scanning direction, and move any one of the first element and the second element in a sub-scanning direction orthogonal to the main-scanning direction, the first element including the plurality of ejectors and the active energy ray irradiator, the second element including an object to which the liquid is ejected; and
a control unit configured to perform control to cause a first ejector of the plurality of ejectors to eject a first ejection amount of liquid, cure the first ejection amount of liquid, cause a second ejector of the plurality of ejectors to eject a second ejection amount of liquid onto the cured first ejection amount of liquid, and cure the second ejection amount of liquid,
wherein
the first ejection amount and the second ejection amount are different from each other, and
the second ejector is different from the first ejector.

2. The liquid ejection device according to claim 1, wherein the control unit is configured to make an ejection amount of liquid to be ejected from the second ejector larger than an ejection amount of liquid to be ejected from the first ejector.

3. The liquid ejection device according to claim 1, wherein the control unit is configured to make an ejection amount of liquid to be ejected from the second ejector smaller than an ejection amount of liquid to be ejected from the first ejector.

4. The liquid ejection device according to claim 2, wherein the control unit is configured to make a probability with which nozzles corresponding to areas around both ends of the first ejector and the second ejector are used, larger than a probability with which nozzles corresponding to the other area are used.

5. The liquid ejection device according to claim 1, wherein the control unit is configured to control an ejection amount of liquid using blue noise characteristics of a mask generation pattern.

6. The liquid ejection device according to claim 2, wherein the liquid comprises clear ink containing no colorant, and the active energy ray irradiator is configured to make an amount of active energy ray to be emitted from the active energy ray irradiator to the clear ink ejected from the first ejector, smaller than an amount of active energy ray to be emitted from the active energy ray irradiator to ink containing a colorant.

7. The liquid ejection device according to claim 3, wherein the liquid comprises clear ink containing no colorant, and the active energy ray irradiator is configured to make an amount of active energy ray to be emitted from the active energy ray irradiator to the clear ink ejected from the second ejector, smaller than an amount of active energy ray to be emitted from the active energy ray irradiator to ink containing a colorant.

8. The liquid ejection device according to claim 1, wherein the active energy ray irradiator is divided into a plurality of blocks, is capable of being turned on partially, and is configured to be turned off at a center part of the plurality of blocks in the sub-scanning direction.

9. The liquid ejection device according to claim 1, wherein the active energy ray irradiator is divided into a plurality of blocks, is capable of being turned on partially, and is configured to be turned off at a front part to a center part of the plurality of blocks in the sub-scanning direction.

10. The liquid ejection device according to claim 1, wherein the active energy ray irradiator is divided into a plurality of blocks, is capable of being turned on partially, and is configured to be turned off at a center part to a back part of the plurality of blocks in the sub-scanning direction.

11. A program for causing a computer configured to control a liquid ejection device including a plurality of ejectors configured to eject active energy ray curable liquid, and an active energy ray irradiator configured to emit an active energy ray to the liquid ejected by the plurality of ejectors, to function as:

a move control unit configured to move any one of a first element and a second element in a main-scanning direction, and move any one of the first element and the second element in a sub-scanning direction orthogonal to the main-scanning direction, the first element including the plurality of ejectors and the active energy ray irradiator, the second element including an object to which the liquid is ejected; and a control unit configured to perform control to cause a first ejector of the plurality of ejectors to eject a first ejection amount of liquid, cure the first ejection amount of liquid, cause a second ejector of the plurality of ejectors to eject a second ejection amount of liquid onto the cured first ejection amount of liquid, and cure the second ejection amount of liquid, wherein the first ejection amount and the second ejection amount are different from each other, and the second ejector is different from the first ejector.

12. An ejection control method for a liquid ejection device including a plurality of ejectors configured to eject active energy ray curable liquid, and an active energy ray irradiator configured to emit an active energy ray to the liquid that is ejected by the plurality of ejectors, the method comprising:

move control including moving any one of a first element and a second element in a main-scanning direction, and moving any one of the first element and the second element in a sub-scanning direction orthogonal to the main-scanning direction, the first element including the plurality of ejectors and the active energy ray irradiator, the second element including an object to which the liquid is ejected; and performing control to cause a first ejector of the plurality of ejectors to eject a first ejection amount of liquid, cure the first ejection amount of liquid, cause a second ejector of the plurality of ejectors to eject a second ejection amount of liquid onto the cured first ejection amount of liquid, and cure the second ejection amount of liquid, wherein the first ejection amount and the second ejection amount are different from each other, and the second ejector is different from the first ejector.

13. The liquid ejection device according to claim 1, wherein an amount of energy of the active energy ray for curing the liquid is based on a liquid ejection amount such that smaller amounts of the liquid are cured with smaller amounts of energy.

14. The liquid ejection device according to claim 1, wherein the liquid comprises clear ink containing no colorant, the first ejector comprises plurality of nozzles configured to eject the clear ink, the second ejector comprises plurality of nozzles configured to eject the clear ink, and a position of the first ejector in the sub-scanning direction is different from a position of the second ejector in the sub-scanning direction.

15. The liquid ejection device according to claim 14, wherein a position of the first ejector in the main-scanning direction is different from a position of the second ejector in the main-scanning direction.

* * * * *